Jan. 22, 1963    H. L. SOSALLA ETAL    3,074,727
GRANULAR MATERIAL APPLICATOR
Filed Sept. 28, 1960    2 Sheets-Sheet 1
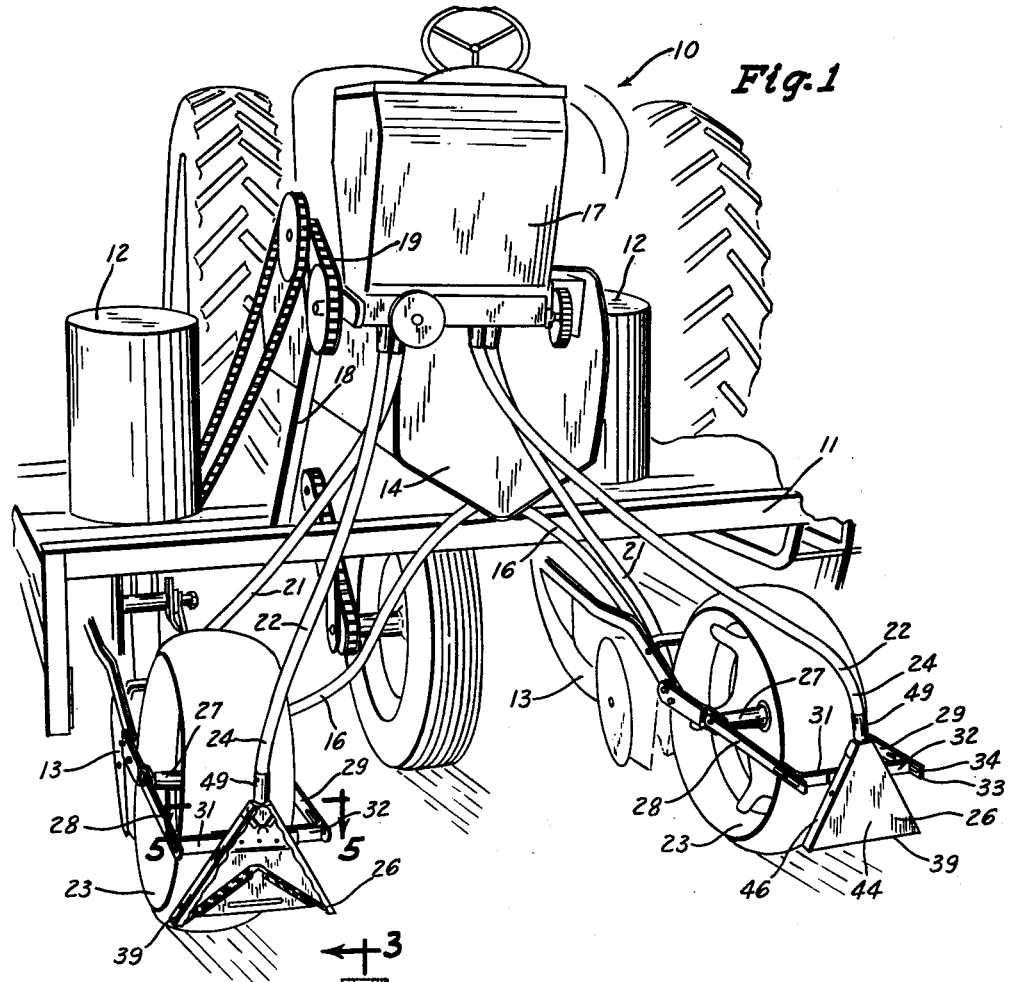
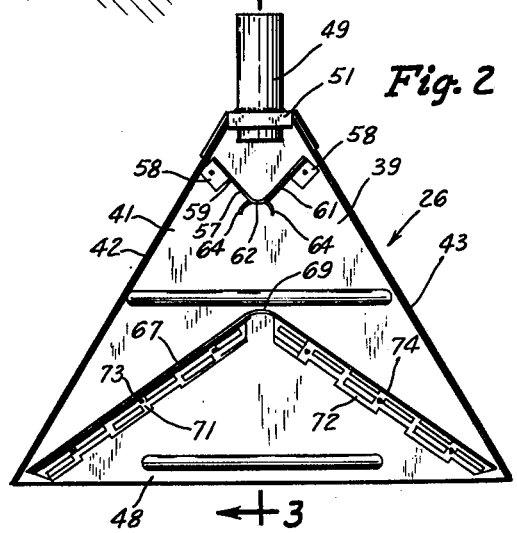
INVENTORS
HARRY L. SOSALLA
RAYMOND E. COATS
BY EMIL A. MADISON
Lowell & Henderson
ATTORNEYS Jan. 22, 1963 H. L. SOSALLA ETAL 3,074,727
GRANULAR MATERIAL APPLICATOR
Filed Sept. 28, 1960 2 Sheets-Sheet 2

INVENTORS
HARRY L. SOSALLA
RAYMOND E. COATS
EMIL A. MADISON
By Lowell & Henderson
ATTORNEYS

3,074,727
GRANULAR MATERIAL APPLICATOR
Harry L. Sosalla, Emil A. Madison and Raymond E. Coats, Sac City, Iowa, assignors to Noble Manufacturing Co., Inc., Sac City, Iowa, a corporation of Iowa
Filed Sept. 28, 1960, Ser. No. 58,924
9 Claims. (Cl. 275—14)

This invention relates to farm equipment and more particularly to an applicator for distributing a granular material evenly over the ground.

The application of granular chemicals to the ground during the planting season by mechanized apparatus attachable to the tractor has always been faced with the problem of effective utilization of the chemicals, namely, a uniform application of the chemicals over localized areas including and adjacent to the seeds being planted. An object therefore of this invention is the provision of a simple and effective applicator device adapted for easy attachment to a planter or lister for spreading a chemical compound evenly over a predetermined area of the ground.

This object and other features and advantages of this invention will become readily apparent from the following description and the accompanying drawings, wherein:

FIG. 1 is a perspective view of the rear of a tractor drawn corn planter and showing a pair of applicator devices of this invention attached thereto, certain parts of one applicator device being broken away for clarity;

FIG. 2 is an elevational view of an applicator device, with a rear cover thereof removed to show more clearly the construction of the applicator device;

Figure 3:
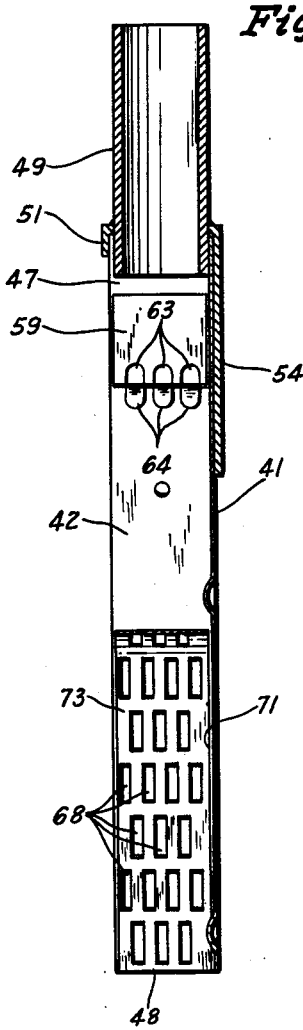
FIG. 3 is an enlarged vertical sectional view taken along the line 3—3 in FIG. 2.

Referring now to the drawings, a tractor 10 is shown for drawing a conventional wheeled corn planter having a frame 11. A plurality, two shown here, of planter units are mounted on the frame, each unit including a container 12 for the seed to be planted and an associated shoe apparatus 13 for placement of the seed into the ground.

Also mounted on the planter frame 11 is a container 14 for transmitting liquid fertilizer through tubes 16 directly behind each shoe apparatus 13. Above the container 14, a hopper 17 is supported from the frame 11, as by one or more mounting brackets 18, for carrying in separate compartments a quantity of herbicide and a quantity of insecticide, both chemicals being in a granular form. The hopper 17 includes a pair of feather bar or agitator shafts (not shown) driven off a planter-driven gear train 19 for supplying the insecticide and the herbicide separately through flexible sets of hoses 21 and 22, respectively, to the front and rear of a compaction wheel 23 trailing each shoe apparatus 13.

At the lower or discharge end 24 of each herbicide hose 22, is an applicator device 26, hereinafter referred to as an "applicator," mounted for distributing the herbicide evenly over the ground, and in a path behind the compaction wheel 23 as the tractor 10 moves forward. Each applicator 26 is adjustably connected to the axle 27 (FIG. 1) for a corresponding compaction wheel 23 by a pair of arms 28 and 29 (FIG. 5), and a pair of L-shaped brackets 31 and 32. The rear ends 33 of the arms are provided with elongated slots 34 (FIG. 5) through which are inserted bolts 36 for connecting the outer ends 35 of the brackets. Slots 37 are also provided in the overlapping ends 38 of the brackets 31. It may readily be seen that this arrangement provides for longitudinal and lateral adjustment of the applicator 26 relative to the compaction wheel 23.

Figure 4:
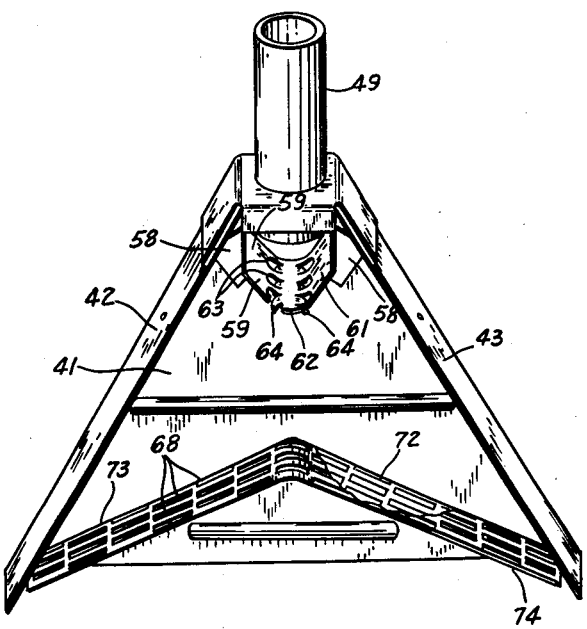
FIG. 4 is a perspective view of an applicator device looking from the upper rear thereof, with the rear cover removed and certain parts broken away for illustrative purposes.

The applicator 26, as best illustrated in FIGS. 2–4, comprises a triangular shaped casing 39 including a front wall or cover 41 and downwardly diverging side walls 42 and 43 integral therewith. A rear cover 44 (FIG. 1) of a shape similar to the front cover 41 completes the casing 39, the rear cover 44 having side walls 46 (only one showing in FIG. 1) removably attached to the front cover 41 by being overlapped and bolted to the front cover side walls 42 and 43.

Figure 5:
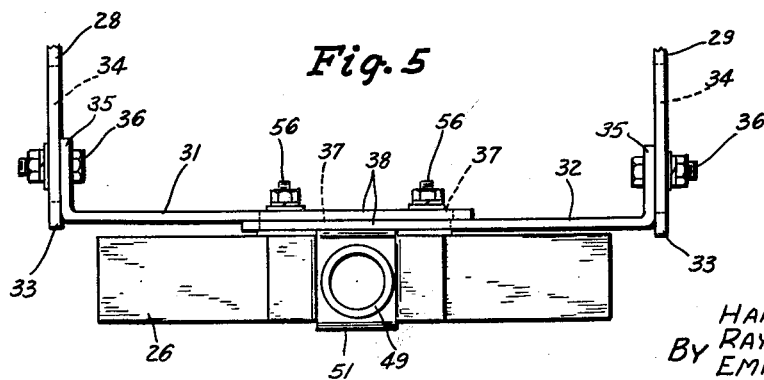
FIG. 5 is a fragmentary top plan view taken along the line 5—5 in FIG. 1.

An inlet opening 47 (FIG. 3) is formed at the top apex of the casing, and an elongated outlet opening 48 is formed at the bottom or base thereof, both openings being defined by the upper and lower edges, respectively, of the front and rear covers 41 and 44 and the side walls 42 and 43. A tubular coupling 49 (FIG. 2) for connection with the hose end 24 is inserted through the inlet opening 47 and suitably secured to the top apex of the casing 39 by a cap 51. A portion 54 (FIG. 3) of the cap 51 depends adjacent and is secured as by spot welding to the front cover 41, and provides a mounting for a pair of mounting bracket bolts 56 (FIG. 5).

Inside the casing 39, a V-shaped member 57 (FIG. 2) is mounted adjacent to and directly below the inlet opening 47. Referring to FIGS. 2 and 3, it is seen that legs 59 and 61 of the member 57 are disposed at substantially right angles to the side walls 42 and 43 and extend across substantially the entire space between the front and rear covers 41 and 44. Ears 58 which are bent at right angles to corresponding legs 59 and 61 are secured, as by spot welding, to the front cover 41. To each side of the apex 62 (FIG. 2) of the V-shaped member 57, a plurality of spaced perforations or slots 63 (FIGS. 3 and 4) are formed by a corresponding plurality of tab portions 64 which are bent in a downwardly curved manner away from the apex 62.

By this arrangement, the granular herbicide material entering the interior of the casing 39 through the inlet opening 47 in the form of a stream drops upon or strikes the V-shaped member 57, so that some portions of the material are deflected and bounced upwardly by the leg members 59 and 61 prior to falling through the slot openings 63, other portions fall directly through the openings 63, while still other portions strike the tabs 64 and are deflected generally toward and against the casing side walls 42 and 43.

For distributing the deflected granular material over the outlet opening 48 so that it falls through the entire cross sectional area of the opening 48 and evenly on the ground, an elongated inverted V-shaped distributor element 67 (FIG. 2) is provided. The distributor element 67 has a plurality of parallel rows of spaced slots 68 formed therein, and includes a pair of flap portions 71 and 72 bent downwardly from the main body of the element 67 for attachment as by spot welding to the front cover 41.

The element 67 is bent at its midpoint to form an apex 69 and a pair of reversely inclined legs 73 and 74 each of which is inclined downwardly and outwardly toward a corresponding side wall. Referring particularly to FIGS. 2 and 3, it is readily seen that the distributor element 67 extends substantially the entire width of the outlet opening 48, and also extends across substantially the entire space between the front and rear covers 41 and 44. It is seen further that the apex 69 of the distributor element 67 is located substantially halfway between the inlet and outlet openings 47 and 48 and is vertically aligned with the apex 62 of the member 57 and the centers of the openings 47 and 48, the centers of the openings 47 and 48 and the apices 62 and 69 all lying along the vertical axis the casing 39.

Thus, by this combined arrangement of the slotted distributor element 67 mounted below the deflector member 57, the granular material entering the casing 39 in a stream is first deflected and dispersed downwardly in a fan-shaped pattern by the deflector member 57, whereupon the material is subsequently again diffused and deflected by the distributor element 67 for an even distribution thereof across the entire cross sectional area of the outlet opening 48 to fall on the ground behind a compaction wheel 23.

Although a preferred embodiment of this invention has been disclosed herein, it is to be remembered that various modifications and alterations can be made thereto without departing from the full scope of the invention as defined in the appended claims.

We claim:

1. An applicator device for distributing granular material over the ground comprising a triangular shaped casing having substantially flat parallel end walls, downwardly diverged side walls, an inlet opening at the apex thereof and an outlet opening coextensive with the base thereof, a deflector means mounted within said casing, comprising a V-shaped member having an apex portion and a pair of legs, said apex portion being below said inlet opening, and said legs having perforations therein at opposite sides of said apex portion, and distribution means comprising an inverted V-shaped perforated member mounted within said casing and extended between said side walls at said outlet opening, with said perforated member having an apex portion located below the apex portion of said deflector means.

2. An applicator device for distributing granular material over the ground comprising a triangular shaped casing having substantially flat parallel end walls, downwardly diverged side walls, a material inlet at the apex portion thereof and a material outlet coextensive with the base thereof, a deflector means mounted within said casing including a V-shaped member having an apex section and leg sections, said apex section being located below said apex portion and each said leg sections being formed at opposite sides of said apex section with openings, deflector elements on said V-shaped member associated with each of said openings to provide for portions of the material from said inlet being deflected toward each side wall, and other portions of said material being directed downwardly through said openings, and distributing means comprising an inverted V-shaped member mounted within said casing and extended across said outlet, said inverted V-shaped member having an apex section and leg sections formed with elongated openings, with said last mentioned apex section being below the apex section of said V-shaped member whereby material deflected downwardly by said deflecting means onto said distributing means is uniformly distributed over said outlet prior to dropping to the ground.

3. An applicator device for distributing granular material which includes, in combination, a casing having front, rear, and side walls, the walls surrounding a space, the cross-section of which, taken horizontally, increases substantially from top to bottom, the casing thus formed having an upper and smaller inlet and a downwardly open lower and larger outlet, said lower outlet, between the side walls, being substantially wider than its length between the front and rear walls, a deflecting element mounted within the casing near the inlet but spaced therefrom, the deflecting element being formed to direct particles passing therethrough generally toward the side walls, a distributor element mounted within the casing near the outlet, said distributor element having an upper, intermediate portion and descending portions extending therefrom downwardly and outwardly toward the side walls of the casing, said descending portions having a plurality of apertures therein for permitting the passage therethrough of particles being dispensed.

4. The structure of claim 3 characterized in that the descending portions terminate short of the lower portions of the side walls, whereby such material as fails to pass through the descending portions will be dispensed.

5. The structure of claim 3 characterized in that the distributor element is mounted upon and secured to the front or rear wall.

6. The structure of claim 3 characterized by and including a delivery duct entering the inlet of the casing and formed and adapted to deliver material against the deflecting element.

7. An applicator device for distributing granular material which includes, in combination, a casing having an upper and smaller inlet, a lower and larger outlet, a deflecting element mounted within the casing near the inlet but spaced therefrom, said deflecting element having a lower portion and ascending portions extending upwardly therefrom toward the casing, a plurality of perforations in said deflecting element, a distributor element mounted within the casing near the outlet, said distributor element having an upper, intermediate portion, descending portions extending therefrom toward the casing, and a plurality of perforations in said distributing element.

8. An applicator device for distributing granular material which includes, in combination, a casing having front and back walls joined by side walls, an upper and smaller inlet, a lower and larger outlet, a deflecting element within the casing near the inlet but spaced therefrom, said element having a centrally lowered portion and ascending portions extending from the lowered portion toward the side walls of the casing, a plurality of perforations throughout the element, a distributor element within the casing near the outlet, the distributor element having a centrally raised portion and descending portions extending from the raised portion toward the side walls of the casing, and a plurality of perforations throughout the distributor element.

9. An applicator device for distributing granular material which includes, in combination, a casing having front and back walls joined by side walls, a deflecting element mounted within the casing near the inlet but spaced therefrom, said deflecting element having a generally central lower portion, ascending portions extending upwardly and outwardly from the lower portion toward the side walls of the casing, a plurality of perforations extending throughout said element, tap portions adjoining said perforations and directed downwardly and outwardly toward the walls of the casing, a distributor element mounted within the casing near the outlet, said distributor element having a generally central raised portion, descending portions extending from the raised portion toward the side walls of the casing, and a plurality of perforations extending throughout said distributor element, the ends of said distributor element terminating short of the side walls.

References Cited in the file of this patent

UNITED STATES PATENTS

| | | |
|---|---|---|
| 2,315,415 | Gilbert | Mar. 30, 1943 |
| 2,641,476 | Keleher | June 9, 1953 |
| 2,990,186 | Gandrud | June 27, 1961 |